(12) United States Patent
Lauria et al.

(10) Patent No.: US 9,785,879 B1
(45) Date of Patent: Oct. 10, 2017

(54) ARRANGEMENT FOR, AND METHOD OF, READING RFID PRODUCT TAGS WITH IMPROVED PERFORMANCE BY READING RFID TAGS OF INTEREST IN A VENUE

(71) Applicant: SYMBOL TECHNOLOGIES, LLC, Lincolnshire, IL (US)

(72) Inventors: Charles Lauria, Miller Place, NY (US); Richard J. Lavery, Huntington, NY (US); Russell E. Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/157,463

(22) Filed: May 18, 2016

(51) Int. Cl.
*G06F 19/00* (2011.01)
*G06K 19/07* (2006.01)
*G06Q 10/08* (2012.01)

(52) U.S. Cl.
CPC ....... *G06K 19/0723* (2013.01); *G06Q 10/087* (2013.01)

(58) Field of Classification Search
CPC .......... G06K 19/0723; G06K 19/0726; G06K 7/0008; G06K 7/10089; G06K 7/10099; G06Q 10/06; G06Q 10/08
USPC .................................................. 235/383, 385
See application file for complete search history.

(56) References Cited

U.S. PATENT DOCUMENTS

| | | | | |
|---|---|---|---|---|
| 9,330,287 | B2 * | 5/2016 | Graczyk | G06K 7/10099 |
| 2007/0096881 | A1 * | 5/2007 | Pillai | G06K 7/0008 |
| | | | | 340/10.51 |
| 2008/0294476 | A1 * | 11/2008 | Dupre | G06Q 30/02 |
| | | | | 705/7.32 |
| 2012/0271715 | A1 * | 10/2012 | Morton | G06Q 30/0257 |
| | | | | 705/14.53 |
| 2013/0229263 | A1 * | 9/2013 | Graczyk | G01S 1/70 |
| | | | | 340/10.1 |

* cited by examiner

*Primary Examiner* — Seung Lee
(74) *Attorney, Agent, or Firm* — Yuri Astvatsaturov

(57) ABSTRACT

Multiple sensing network units are deployed overhead in a venue, in which RFID tags of interest and RFID product tags are also deployed. Each unit supports an RFID locationing system for reading the product tags in a reading mode of operation with a set of reading parameters, for reading the RFID tags of interest in the venue, for changing at least one of the reading parameters in response to reading an RFID tag of interest that is proximal to a zone of interest, and for reading with emphasis the product tags that are in the zone of interest with the changed reading parameter.

20 Claims, 9 Drawing Sheets

ARRANGEMENT FOR, AND METHOD OF, READING RFID PRODUCT TAGS WITH IMPROVED PERFORMANCE BY READING RFID TAGS OF INTEREST IN A VENUE

BACKGROUND OF THE INVENTION

The present disclosure relates generally to an arrangement for, and a method of, reading radio frequency (RF) identification (RFID) product tags associated with products in a venue in real time with an enhanced performance, especially for rapidly and accurately locating and tracking such RFID product tags associated with products located in zones of interest in the venue.

It is known to deploy a radio frequency (RF) identification (RFID) system in a retail, factory, or warehouse environment, or a like controlled area or venue, for product locationing, product tracking, product identification, and inventory control. For example, in order to take an inventory of products associated with RFID product tags in a warehouse environment or venue, it is known to position a plurality of RFID tag readers or sensing network units at overhead, fixed locations, on the ceiling, or at doorways, loading docks, and assembly lines, in the venue, and then, to operate each such reader, under the control of a network host computer or server, to form and steer an interrogation beam, both in azimuth, e.g., over an angle of 360 degrees around a vertical axis, and in elevation, e.g., over an angle of about 90 degrees away from the vertical axis, over a coverage range across any such product tags to read their payloads. Each RFID product tag is usually attached to, or associated with, an individual product, or to a package for the product, or to a pallet or container for multiple products, or to a freight mover, such as a forklift or truck, for moving such products, packages, or pallets in the venue. Each RFID product tag typically includes a tag antenna, a power management section, a radio section, and frequently a logic section, a memory, or both. A multitude of such product tags may be in the coverage range of each RFID reader.

In brief, each RFID reader transmits an RF interrogating signal, and each RFID product tag, which senses the interrogating RF signal, responds by transmitting a return RF signal. Each RFID product tag either generates the return RF signal originally, or reflects back a portion of the interrogating RF signal in a process known as backscatter. The return RF signal may further encode data stored internally in the product tag. The return signal is demodulated and decoded into identification data (also known as the payload) by each reader, which thereby identifies, counts, or otherwise interacts with the associated product. The decoded data can denote a serial number, a price, a date, a destination, a location, other attribute(s), or any combination of attributes, and so on. A specific location of any particular RFID-tagged product in the venue is typically determined by having the server process the payloads and capture data from a plurality of such RFID readers by using triangulation/trilateration techniques known in the art.

As advantageous as such known RFID systems have been in identifying, locating and tracking products with RFID product tags, especially low-cost passive tags, it has proven difficult in practice to accurately and rapidly locate each product tag, especially when one or more of the product tags have moved, as well as when there is a multitude, e.g., a product tag population of many thousands, of such product tags in the venue. In addition, the venue itself has structures, such as shelving and like fixtures, as well as walls, the floor and the ceiling, and even people and moving equipment, all of which and more can reflect and/or scatter and/or absorb the RF signals, thereby causing the RF signals to travel along multiple, disrupted, folded paths and negatively impacting the travel of the RF signals between the RFID product tags and each RFID reader. Each RFID reader reads at a certain read rate, for example, about 100-200 product tags per second, and it takes a certain, non-negligible amount of time to read an entire product tag population. Sometimes, each RFID reader has to read an individual product tag more than once to accurately determine its location. When an RFID-tagged product has moved, i.e., when its location has changed to a new location, the time that it takes to provide an update of its new location is negatively affected by the presence of a large number of other product tags. It is not always possible to know, at least not immediately, when a particular product tag has moved, because the system must typically identify and locate all the product tags before it can determine whether any particular product tag has moved. The amount of time it takes to determine the new location of a product tag that has moved is a linear function of the number of the product tags within the coverage range of the reader(s). Real time reading performance, on the order of one second or less, for rapidly determining the new location of a product tag that has moved, or for accurately locating any particular product tag, is a challenge that known RFID systems have not always adequately met.

In addition, there are crucial times during RFID system operation when, and/or crucial sites in the venue where, it is essential to accurately and rapidly locate and track the product tags. For example, during merchandise stock movement of products being unloaded at unloading bays in the venue, or being replenished on shelves in the venue, or being moved from a backroom onto a sales floor, or being unpacked to a storage area, and so forth, missed and/or misdirected product tag reads at such crucial sites and at such crucial times can result in inaccurate inventory estimates, which is an important concern for all businesses, especially retailers. Overstating inventory hurts sales and adversely affects shopper satisfaction. Understating inventory triggers orders for more merchandise, thereby resulting in overstocked storerooms. Countless person-hours are spent in accounting for missing or misplaced products due to unreliable, inaccurate, and untimely inventory counts.

Accordingly, there is a need to more accurately and rapidly locate such product tags, especially at crucial times during RFID system operation and/or at crucial sites in the venue, and to enhance the reading performance of such RFID systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
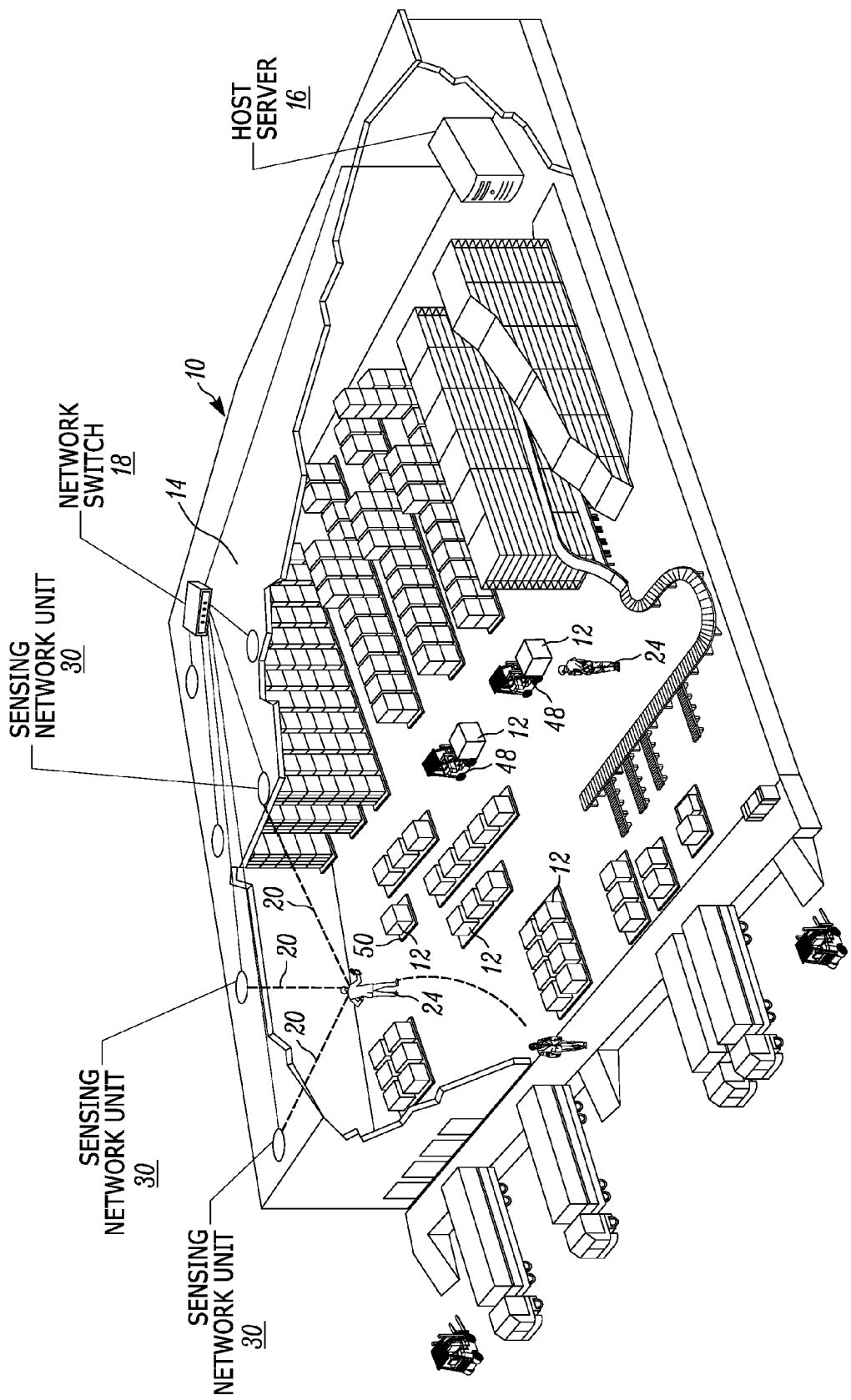
FIG. 1 is a broken-away, perspective view, as seen from above, of an arrangement of multiple, overhead, sensing network units deployed in a warehouse venue, each having an RFID locationing system for reading RFID product tags associated with products that are located in zones of interest in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for locating radio frequency (RF) identification (RFID) product tags associated with products in a venue, such as a retail, factory, or warehouse environment. The arrangement includes one or more RFID tags of interest associated with, and proximal to, one or more zones of interest, also known as "hot spots," in the venue. Some RFID tags of interest may be jointly movable with a user in the venue, for example, by being worn and/or carried by the user. Other RFID tags of interest may be jointly movable with a product mover, such as a pallet or a shopping cart, for supporting and moving products in the venue. Still other tags of interest may include one or more RFID product tags that have been read for the first time, or that have not been read for a predetermined amount of time and that have subsequently being read again. Each RFID tag of interest has a unique payload and locates each zone of interest. Each zone of interest represents, for example, a site at which some critical merchandise movement occurs. This can occur, for example, during merchandise stock movement of products being unloaded at unloading bays in the venue, or being replenished on shelves in the venue, or being moved from a backroom onto a sales floor, or being unpacked to a storage area, and so forth. Each zone of interest can also represent a site where one or more RFID product tags have been read for the first time, or have not been read for a predetermined amount of time and have subsequently being read again.

The arrangement further includes an RFID locationing system for reading the RFID product tags in a reading mode of operation with a set of reading parameters, and for reading each RFID tag of interest deployed in the venue. In response to reading each RFID tag of interest, the RFID locationing system changes at least one of the reading parameters. The RFID locationing system reads with emphasis the RFID product tags that are in each zone of interest with the changed at least one reading parameter. Advantageously, the reading parameters include a dwell time of an RF interrogation signal transmitted by the RFID locationing system, a transmit power at which the RF interrogation signal is transmitted, a transmit direction along which the RF interrogation signal is transmitted, and a firing order of a plurality of RF interrogation signals that are transmitted by the RFID locationing system.

A further aspect of this disclosure is directed to a method of locating radio frequency (RF) identification (RFID) product tags associated with products in a venue. The method is performed by associating at least one RFID tag of interest with, and proximal to, at least one zone of interest in the venue; by reading the RFID product tags in a reading mode of operation with a set of reading parameters; by reading the at least one RFID tag of interest; by changing at least one of the reading parameters in response to reading the at least one RFID tag of interest; and by reading with emphasis the RFID product tags that are in the at least one zone of interest with the changed at least one reading parameter.

In accordance with this disclosure, once an RFID tag of interest is read and its corresponding proximal zone of interest is located, the RFID locationing system directs its reading operation with emphasis to those RFID product tags that are in that zone of interest. In this way, the RFID locationing system is dynamically configured in real time to concentrate and target its reading operation to those RFID product tags that are in that zone of interest, and not to direct its reading operation, or at least not to fully direct its reading operation, to product tags in other zones, i.e., zones that are currently not of interest. Merchandise stock movement performed at crucial times and/or at crucial sites is thus accurately and rapidly located and tracked. Product tag reads at such sites no longer result in inaccurate inventory estimates, because the possibility of missed and/or misdirected product tag reads at such crucial times and/or at such crucial sites has been minimized.

Turning now to the drawings, reference numeral 10 in FIG. 1 generally depicts a warehouse environment or venue in which a plurality of sensing network units 30 is fixedly mounted overhead on, or adjacent to, a ceiling 14. Although the venue 10 has been illustrated as a warehouse, this is merely exemplary, because the sensing network units 30 can be mounted in many diverse venues, especially retail stores, and not necessarily on the ceiling 14. As described below in connection with FIG. 7, the venue 10 may have zones of interest 92, 94, also known as "hot spots," and zones of no or little interest 96, 98, also known as "cold spots," spaced apart from one another. Advantageously, as also described below in connection with FIGS. 8-9, the sensing network units 30 can be installed every twenty to eighty feet or so apart in a grid. As further described below, each sensing network unit 30 has a radio frequency (RF) identification (RFID) reader or locationing system 34 operative for reading RFID product tags 22 (see FIG. 3) that are associated with, or borne on, products 12, shown in FIG. 1 as cartons for simplicity. Multiple products 12 may be supported on pallets 50, shopping carts 54 (see FIG. 4), or like movable platforms that are moved by freight movers, such as forklifts 48, which are operated by users 24. Some users 24 may move individual products 12 without using the forklifts 48, for example, during retrieval of individual products 12 off shelves from a picklist during an order fulfillment task.

A network host computer or server 16, typically locally located in a backroom at the venue 10, comprises one or more computers and is in wired, wireless, direct, or networked communication with each sensing network unit 30 via a network switch 18. The server 16 may also be remotely hosted in a cloud server. The server 16 may include a wireless RF transceiver that communicates with each sensing network unit 30. For example, Wi-Fi and Bluetooth® are open wireless standards for exchanging data between electronic devices. The server 16 is connected to the RFID locationing system 34 in each sensing network unit 30. As diagrammatically shown by the dashed lines 20 in FIG. 1, and as described more fully below, three of the sensing network units 30 can be used to locate a user 24 in the venue 10 by triangulation or trilateration.

Figure 2:
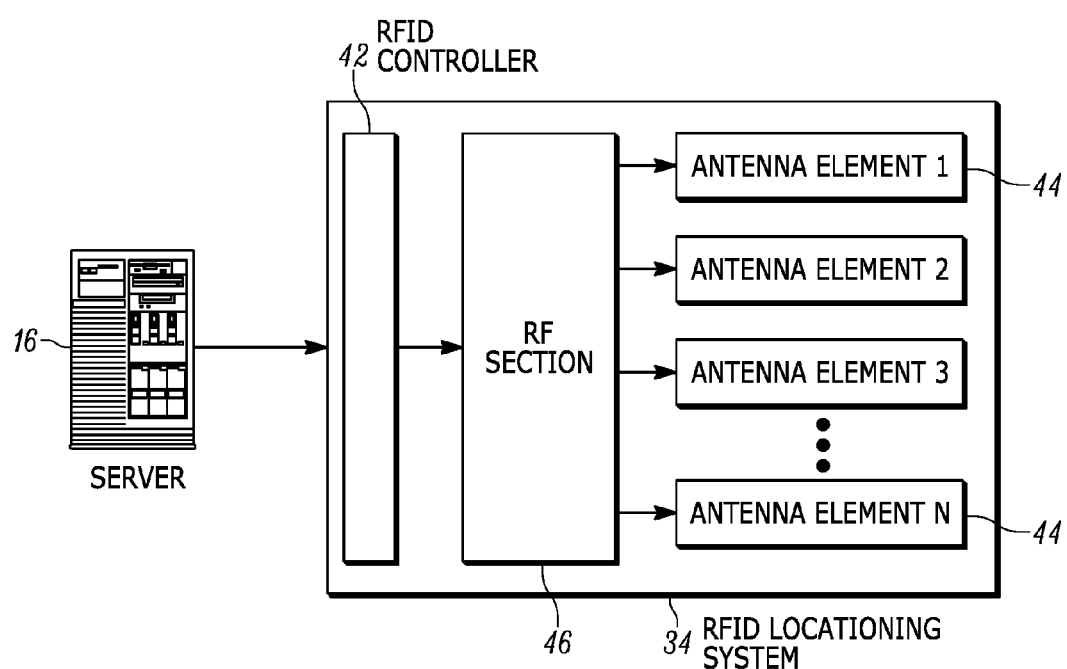
FIG. 2 is a view depicting RFID components of a representative RFID locationing system of FIG. 1.
Figure 7:
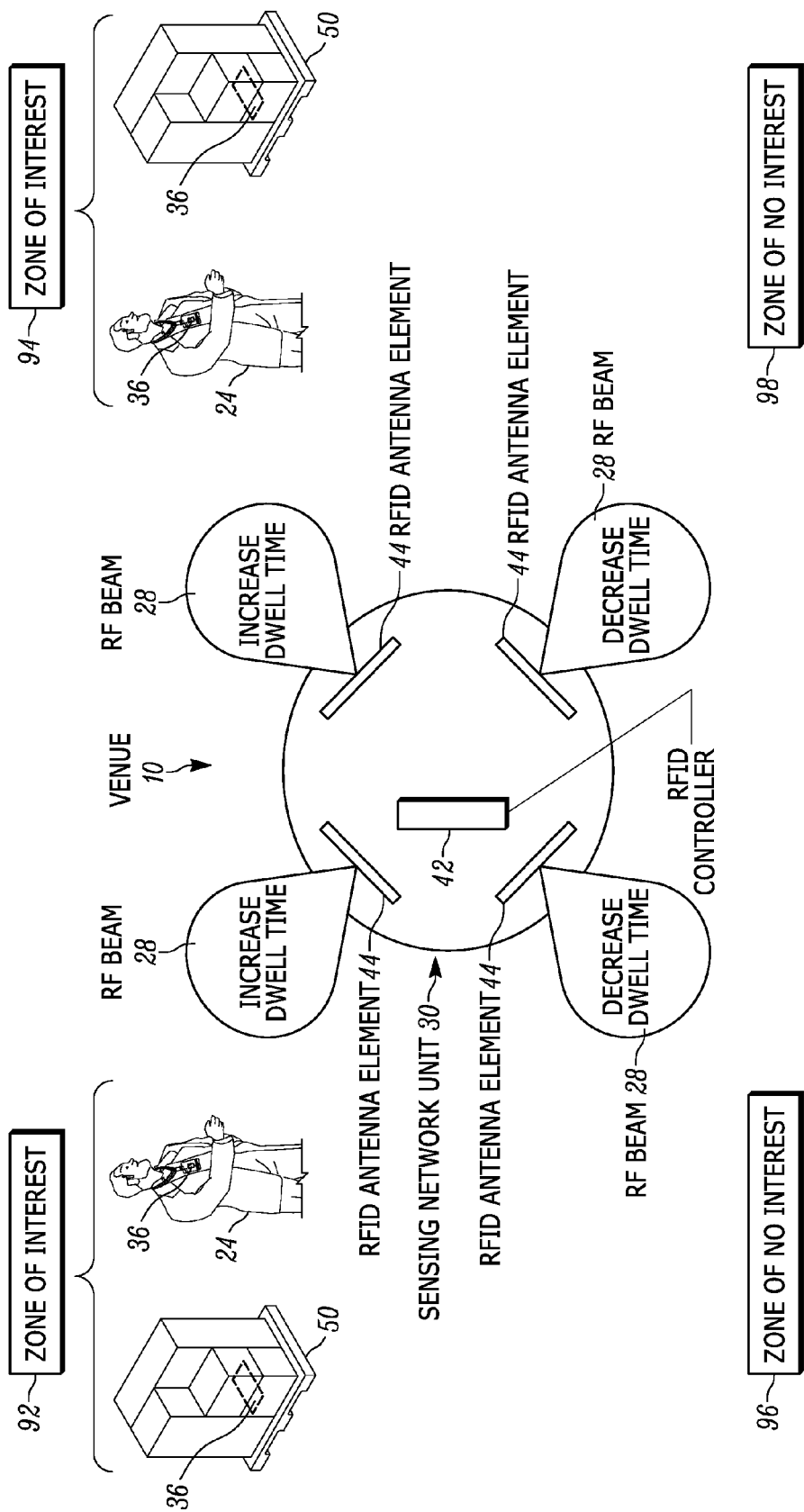
FIG. 7 is a diagrammatic top plan view depicting one example of how the performance of an RFID locationing system can be improved at a representative sensing network unit.

As shown in FIG. 2, each RFID locationing system 34 has a plurality or array of antenna elements 1, 2, 3 . . . , N, each generally identified by the reference numeral 44, and connected to an RF section 46, which, in turn, is connected to an RFID controller 42 to control its operation. The number N is arbitrary and depends on the particular application. As shown in FIG. 7, the RF antenna elements 44 are mounted inside a housing of each sensing network unit 30 and are arranged, preferably equiangularly spaced apart, about an upright axis. The housing covers the RF antenna elements 44 and acts as a radome to protect them. The housing is constituted of a material, such as plastic, through which RF signals can readily pass.

The RFID controller 42 steers interrogation beams 28 (see FIG. 7) radiated by the antenna elements 44 over the RFID product tags 22 in the venue 10. More particularly, the RF section 46 includes control and processing electronics that is operatively connected to the antenna elements 44, for energizing the antenna elements 44 in a firing order. The RF section 46 includes an RF transceiver operated, under the control of the RFID controller 42, to form and steer the interrogating RF beams 28 (see FIG. 7) across, and interrogate and process the payloads of, any RFID product tags 22 that are in its coverage range. It will be understood that there may be thousands of RFID product tags 22 in the venue 10. The antenna elements 44 receive a return RF beam from the interrogated product tag(s) 22, and the RFID controller 42 decodes an RF signal from the return RF beam into decoded data. The decoded data, also known as a payload or captured target data, can denote a serial number, a price, a date, a destination, a location, other attribute(s), or any combination of attributes, and so on, for the RFID-tagged product 12.

As described above, there are crucial times during operation of the RFID locationing system 34 when, and/or crucial sites in the venue 10 where, it is essential to accurately and rapidly locate and track the product tags 22. For example, during merchandise stock movement of products 12 being unloaded at unloading bays in the venue 10, or being replenished on shelves in the venue 10, or being moved from a backroom onto a sales floor, or being unpacked to a storage area, and so forth, missed and/or misdirected product tag reads at such crucial sites and at such crucial times can result in inaccurate inventory estimates. As another example, it is sometimes also essential to accurately and rapidly locate and track the RFID product tags 22 at a site where one or more product tags 22 have been read for the first time, or have not been read for a predetermined amount of time and subsequently have been read again. This disclosure is addressed to preventing such missed and/or misdirected product tag reads at such crucial sites and at such crucial times.

In accordance with this disclosure, one or more RFID tags of interest (TOIs) 36, as shown in FIGS. 3-6, are deployed in the venue 10, and are also read by the RFID locationing system 34 to locate the aforementioned zones 92 or 94 of interest in the venue 10. These zones 92 or 94 of interest are the zones associated with the aforementioned crucial sites at which merchandise stock movement occurs at crucial times, or where one or more product tags 22 have been read for the first time, or have not been read for a predetermined amount of time and have subsequently being read again. Each RFID tag of interest 36 has a unique payload that is different from the payloads of the RFID product tags 22, although the RFID tags of interest 36 and the RFID product tags 22 are both preferably configured as passive RFID tags, for cost reasons.

Figure 3:
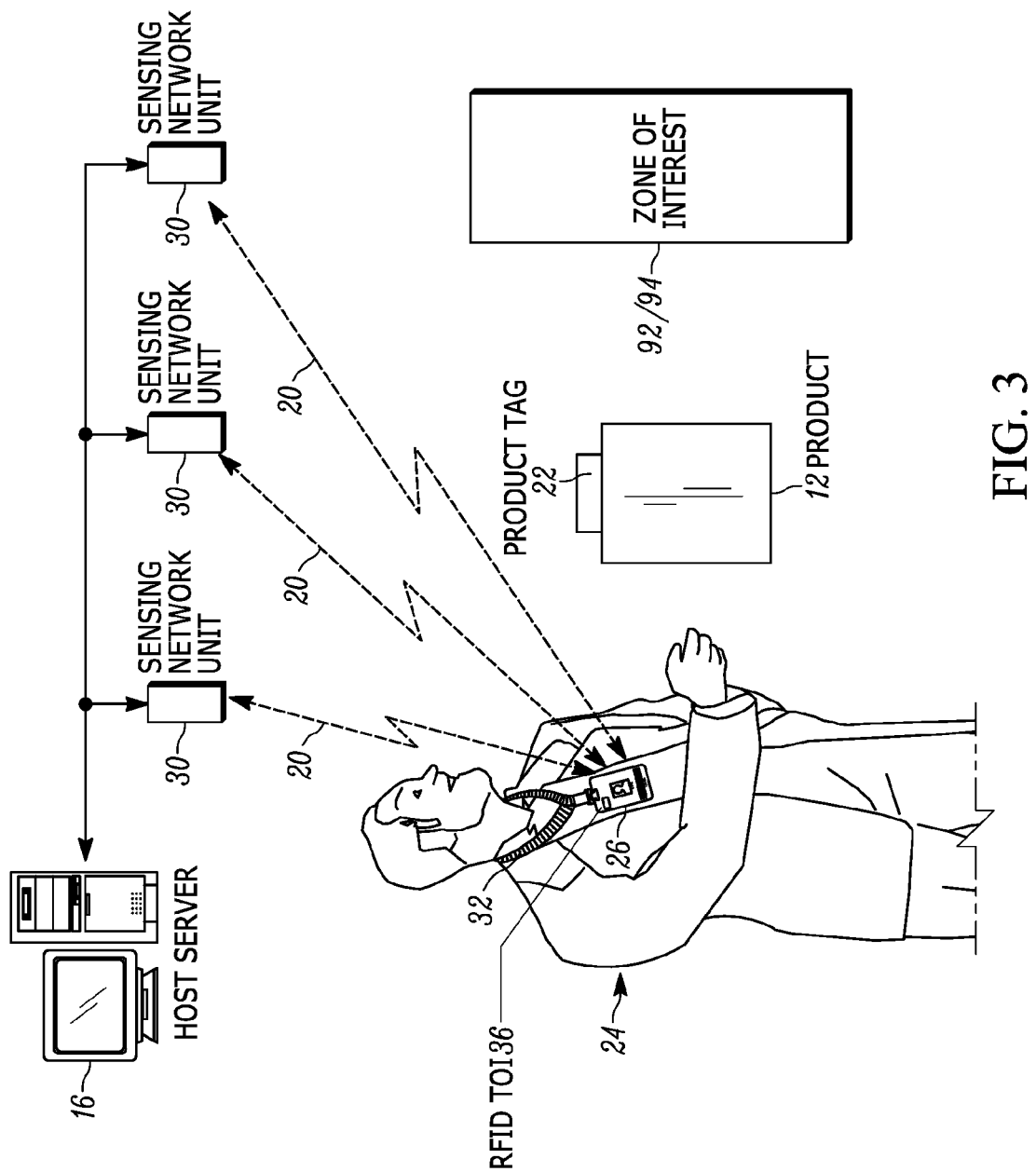
FIG. 3 is a view depicting a user proximal to a zone of interest, and wearing an identity badge having an RFID tag of interest whose location is sensed by the sensing network units of FIG. 1.

As depicted in FIG. 3, three of the sensing network units 30 can be used to locate an RFID tag of interest 36, which may be incorporated in an employee identity badge 26, preferably having an image 62 of the employee 24 (see FIG. 5), by triangulation or trilateration, as diagrammatically shown by the dashed lines 20. The RFID tag of interest 36 and the badge 26 are associated, and jointly movable, with the user 24, e.g., by being supported and/or carried and/or worn by the user 24, for example, by being suspended from a neck strap 32. The RFID tag of interest 36 can be incorporated into any badge, token, garment or device capable of identifying the location of the user 24. The device can be any mobile device held or carried, and operated, by the user 24, including but not limited to, handheld RFID tag readers, handheld bar code symbol readers, phones, radios, watches, tablets, glasses, radios, or computers. The device can be any freight mover operated by the user 24, including but not limited to, the forklift 48 or the shopping cart 64. The user 24 may be any person, employee, operator, associate, or shopper movable within the venue 10, and responsible for moving the products 12.

Figure 4:
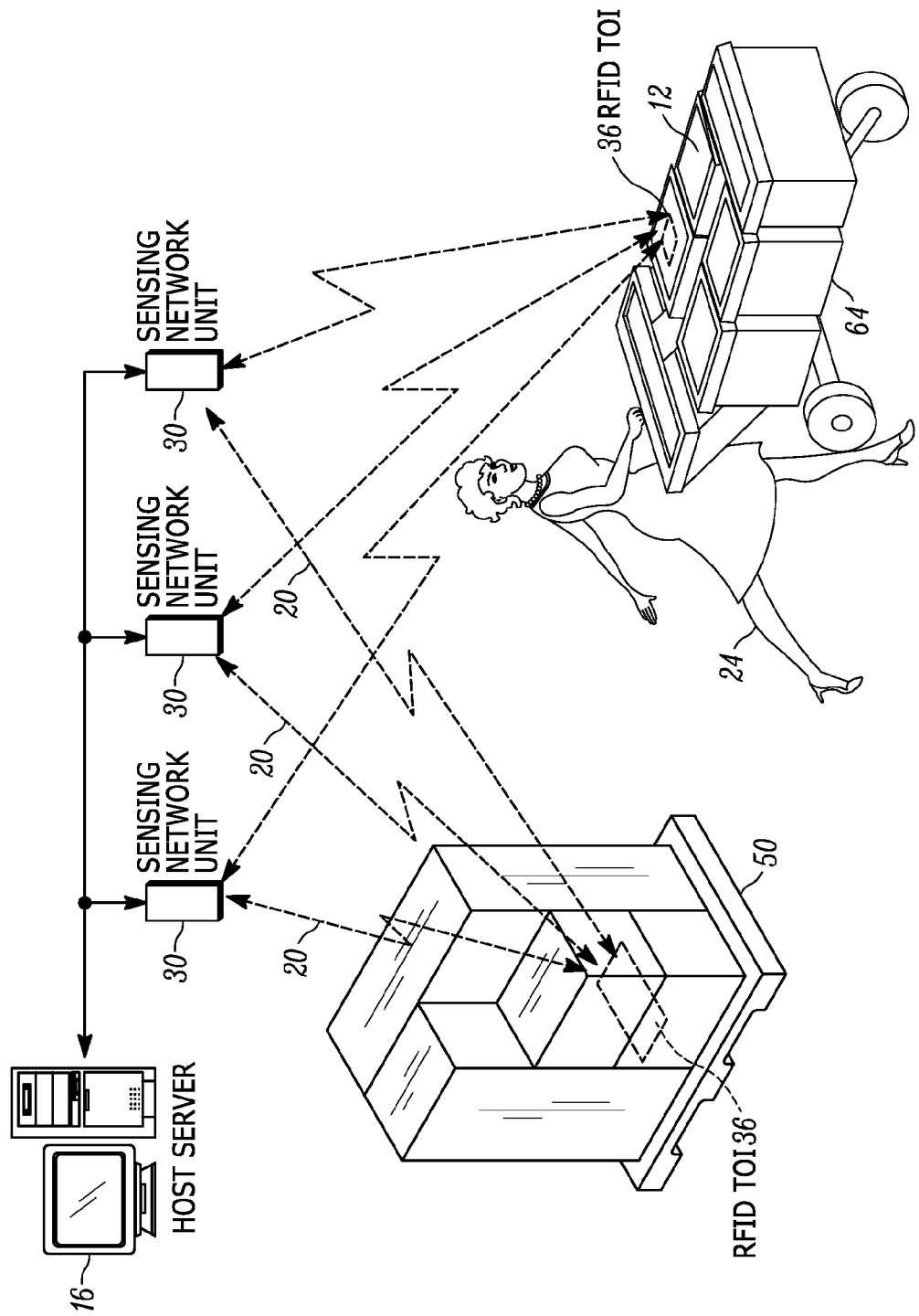
FIG. 4 is a view depicting a product-supporting pallet proximal to a zone of interest, as well as a shopper pushing a shopping cart having products proximal to a zone of interest, the products and/or the cart having at least one RFID tag of interest whose location is sensed by the sensing network units of FIG. 1.
Figure 5:
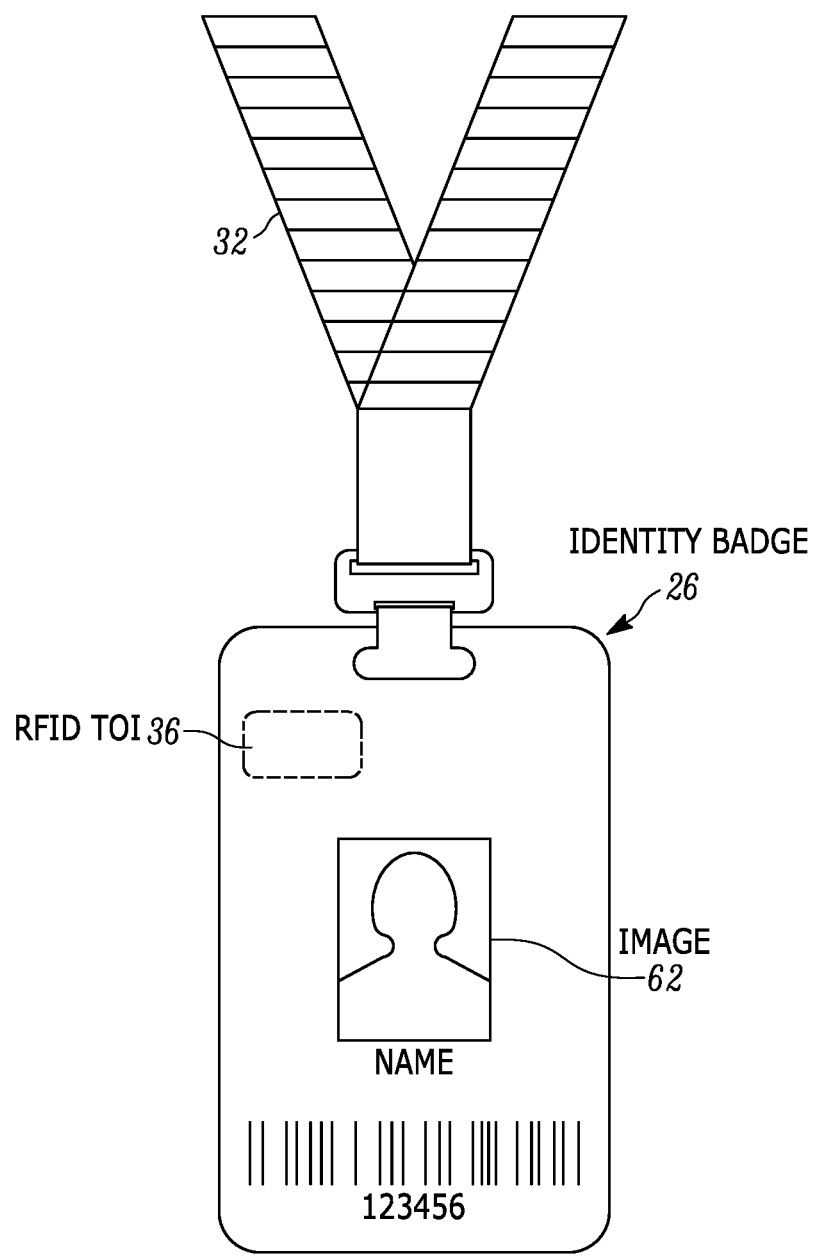
FIG. 5 is an enlarged, close-up view of the identity badge of FIG. 3.
Figure 6:
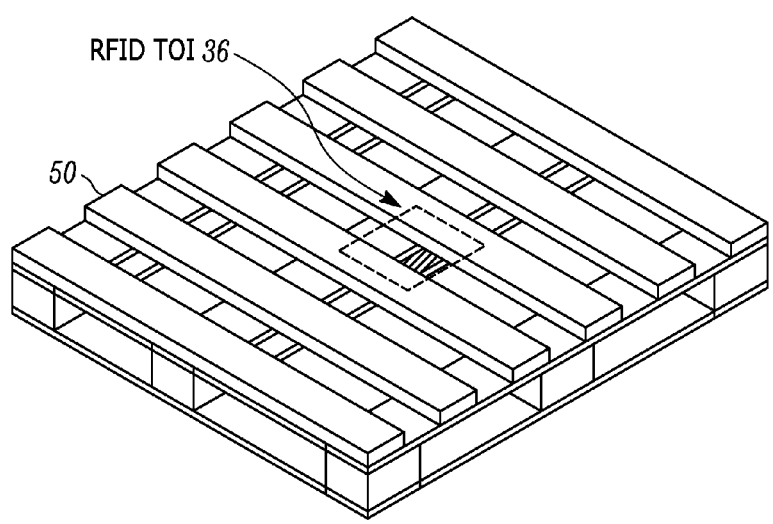
FIG. 6 is a close-up view of the pallet of FIG. 4 in isolation.

As depicted in FIG. 4, three of the sensing network units 30 can also be used to locate an RFID tag of interest 36, which may be incorporated in the pallet 50 or in the shopping cart 64. The RFID tag of interest 36 can be attached anywhere on the pallet 50 and, as shown in FIG. 6, is advantageously mounted at an underside of the pallet 50. The RFID tag of interest 36 and the pallet 50 are jointly movable. The RFID tag of interest 36 can be attached anywhere on the shopping cart 64, or on one or more of the products 12 in the shopping cart 64.

In accordance with this disclosure, once the RFID locationing system 34 reads an RFID tag of interest 36, either associated with the user 24, or with the pallet 50, or with the cart 64, or with one or more products 12, then the RFID locationing system 34 will recognize that the RFID tag of interest 36 is proximal to a zone 92 or 94 of interest. Once the RFID tag of interest 36 and its corresponding proximal zone 92 or 94 of interest are located, the RFID locationing system 34 will direct its reading operation with emphasis to read those product tags 22 that are in that zone 92 or 94 of interest. In this way, the RFID locationing system 34 is dynamically configured in real time to concentrate and target its reading operation to those product tags 22 that are in that zone 92 or 94 of interest, and not to direct its reading operation, or at least not to fully direct its reading operation, to product tags 22 in other zones, i.e., zones 96 or 98 that are currently not of interest or of little interest. As described below, merchandise stock movement performed at the crucial sites or zones 92 or 94, or reading one or more RFID product tags 22 have been read for the first time at the crucial sites or zones 92 or 94, or not reading one or more product tags 22 at the crucial sites or zones 92 or 94 for a predetermined amount of time and subsequently being read again, is thus accurately and rapidly located and tracked.

As shown in FIG. 7, the RFID locationing system 34 initially reads the RFID product tags 22 in a reading mode of operation with a set of reading parameters or settings. One such reading parameter is the duration of a dwell time of an RF interrogation signal transmitted by the RFID locationing system 34. The dwell time is the length of time that an RFID product tag 22 stays in the field of the RF interrogation beam 28. The RFID controller 42 varies the dwell time, or any other reading parameter or setting, after the RFID locationing system 34 has also read an RFID tag of interest 36. The reading of the RFID tag of interest 36 locates the RFID tag of interest 36 and its proximal zone 92 or 94 of interest, where, for example, a crucial stock merchandise movement is occurring at a crucial time. The RFID controller 42 will then directly proportionately increase the dwell time, or adjust any other reading parameter, and vice versa, to concentrate and target the RFID reading operation to read those RFID product tags 22 that are in that zone 92 or 94 of interest, and not to direct its reading operation, or at least not to fully direct its reading operation, to product tags 22 in other zones, i.e., zones 96 or 98 that are currently of no or little interest.

Other reading parameters that can be changed include, but are not limited to, a transmit power at which the RF signal is transmitted, and/or a transmit direction along which the RF signal is transmitted, and/or a firing order of a plurality of RF signals that are transmitted by the RF antenna elements 44. Any one or more of such reading parameters can be varied in any combination.

Figure 8:
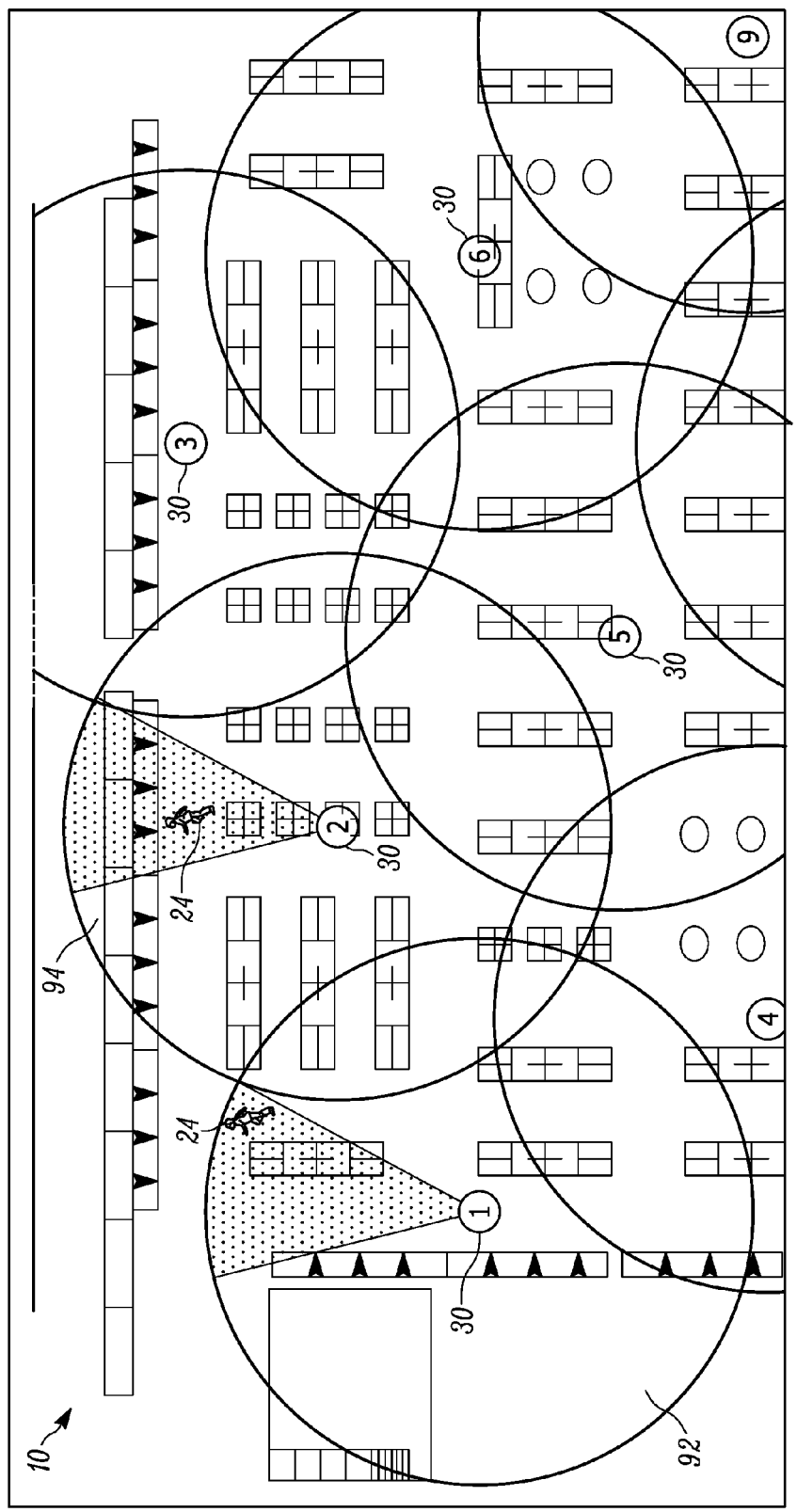
FIG. 8 is a diagrammatic top plan view depicting one example of how the RFID locationing systems cooperate.
Figure 9:
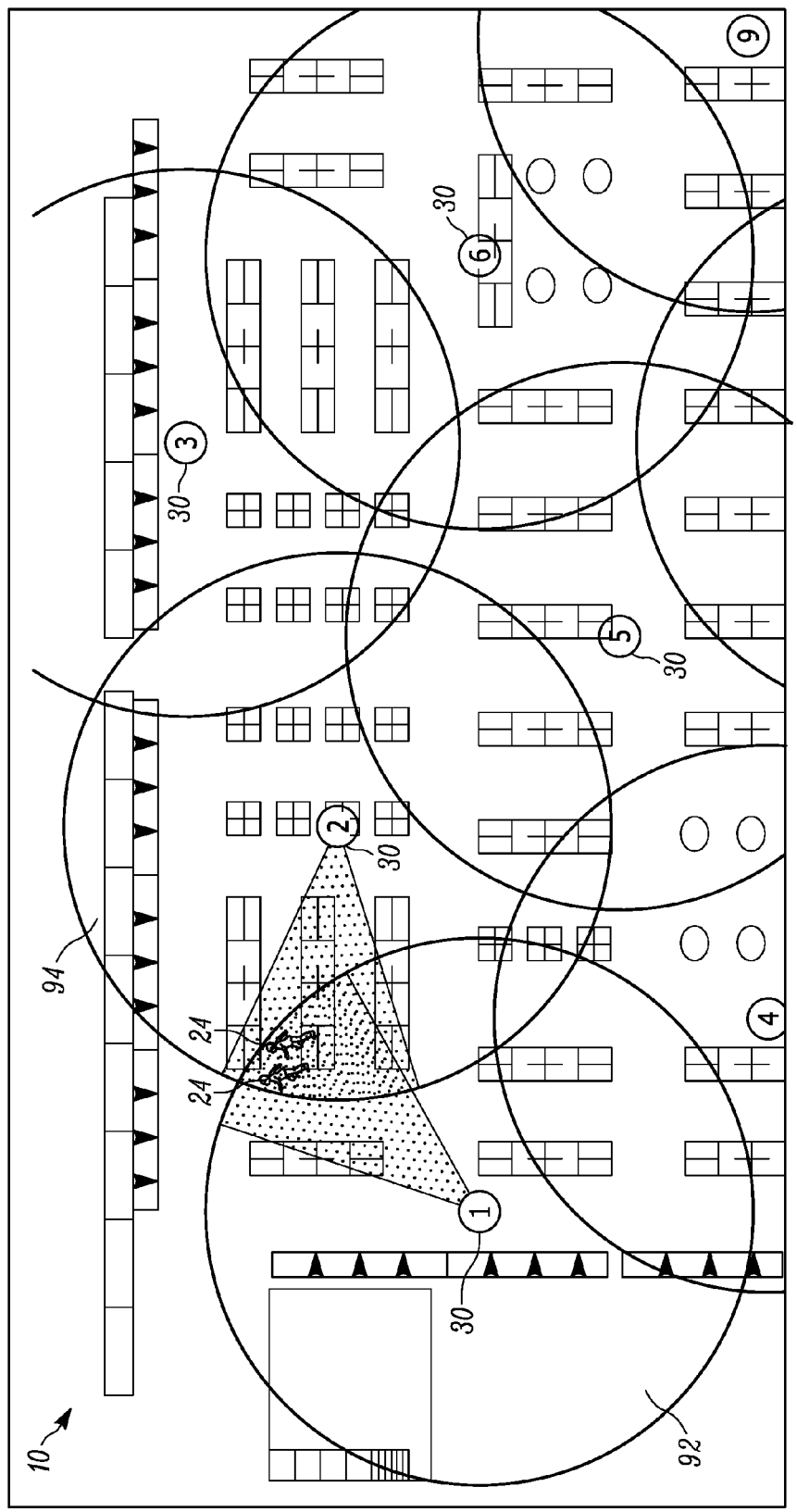
FIG. 9 is a diagrammatic top plan view depicting another example of how the RFID locationing systems cooperate.

FIGS. 8-9 are overhead views depicting a preferred layout of the network sensing units 30 in a grid pattern. Zones 92 and 94 are deemed to be of interest, because the users 24 in those zones are carrying RFID tags of interest 36, in which case, the RFID locationing systems 34 in the network sensing units 30 will read with emphasis the RFID product tags 22 on any products 12 in the zones 92 or 94. In FIG. 9, two users 24 are located in an area overlapped by both zones 92 and 94, thereby causing an even more concentrated and targeted reading operation of those RFID product tags 22 that are in that overlapping area.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for use within a venue, the arrangement comprising:
   at least one radio frequency (RF) identification (RFID) tag of interest; and
   an RFID locationing system for reading at least one RFID product tag and the at least one RFID tag of interest, the RFID locationing system configured to read the at least one RFID product tag using at least one of a first setting and a second setting,
   wherein the RFID locationing system is configured to associate a respective zone of interest with each of the at least one RFID tag of interest, and
   wherein, within the respective zone of interest, the RFID locationing system is further configured to switch from reading the at least one RFID product tag using the first setting to reading the at least one RFID product tag using the second setting.

2. The arrangement of claim 1, wherein the first setting includes a first dwell time of an RF interrogation signal and the second setting includes a second dwell time of the RF interrogation signal that is different from the first dwell time.

3. The arrangement of claim 1, wherein the first setting includes a first transmit power of an RF interrogation signal and the second setting includes a second transmit power of the RF interrogation signal that is different from the first transmit power.

4. The arrangement of claim 1, wherein the first setting includes a first transmit direction of an RF interrogation signal and the second setting includes a second transmit direction of the RF interrogation signal that is different from the first transmit direction.

5. The arrangement of claim 1, wherein the first setting includes a first firing order of a plurality of RF interrogation signals and the second setting includes a second firing order of the plurality of RF interrogation signals that is different from the first firing order.

6. The arrangement of claim 1, wherein the RFID locationing system includes a plurality of sensing network units each having a range, and wherein each of the zone of interest is defined by the respective range of at least one of the plurality of sensing network units that reads the at least one RFID tag of interest.

7. The arrangement of claim 1, wherein the at least one RFID tag of interest is at least one of an RFID product tag that has been read by the RFID locationing system for a first time and an RFID product tag that has not been read by the RFID locationing system for a predetermined amount of time and has subsequently been read again.

8. An arrangement for use within a venue, the arrangement comprising:
   a plurality of sensing network units each having a range and operable to read a plurality of radio frequency (RF) identification (RFID) product tags using at least a first setting and a second setting; and
   at least one RFID tag of interest;
   wherein, upon sensing the at least one RFID tag of interest within its respective range, each of the plurality of sensing network units is operable to switch from reading the RFID product tags using the first setting to reading the RFID product tags using the second setting.

9. The arrangement of claim 8, wherein the first setting includes a first dwell time of an RF interrogation signal and the second setting includes a second dwell time of the RF interrogation signal that is different from the first dwell time.

10. The arrangement of claim 8, wherein the first setting includes a first transmit power of an RF interrogation signal and the second setting includes a second transmit power of the RF interrogation signal that is different from the first transmit power.

11. The arrangement of claim 8, wherein the first setting includes a first transmit direction of an RF interrogation signal and the second setting includes a second transmit direction of the RF interrogation signal that is different from the first transmit direction.

12. The arrangement of claim 8, wherein the first setting includes a first firing order of a plurality of RF interrogation signals and the second setting includes a second firing order of the plurality of RF interrogation signals that is different from the first firing order.

13. The arrangement of claim 8, wherein the at least one RFID tag of interest is at least one of an RFID product tag that has been read by one of the plurality of sensing network units for a first time and an RFID product tag that has not been read by one of the plurality of sensing network units for a predetermined amount of time and has subsequently been read again.

14. The arrangement of claim 8, wherein each of the sensing network units includes a plurality of equiangularly spaced apart antenna elements positioned about an upright axis.

15. A method of reading at least one radio frequency (RF) identification (RFID) product tag using at least one of a first setting and a second setting, the method comprising the steps of:
   reading at least one RFID tag of interest;
   associating a respective zone of interest with each of the at least one RFID tag of interest; and
   within the respective zone of interest, switching from reading the at least one RFID product tag using the first setting to reading the at least one RFID product tag using the second setting.

16. The method of claim 15, wherein the step of switching from reading the at least one RFID product tag using the first setting to reading the at least one RFID product tag using the second setting includes varying at least one of a dwell time of an RF interrogation signal, a transmit power of the RF interrogation signal, a transmit direction of the RF interrogation signal, and a firing order of a plurality of RF interrogation signals.

17. The method of claim 15, wherein the step of reading the at least one RFID tag of interest further includes reading the at least one RFID tag of interest via a sensing network unit having a range, and wherein the respective zone of interest is defined by the range of the sensing network unit that has read the at least one RFID tag of interest.

18. The method of claim 17, further comprising providing the sensing network unit with a plurality of antenna elements positioned about an upright axis; and mounting the sensing network unit in a housing.

19. The method of claim 18, wherein the plurality of antenna elements are equiangularly spaced apart.

20. The method of claim 15, wherein the at least one RFID tag of interest is at least one of an RFID product tag that has been read by the RFID locationing system for a first time and an RFID product tag that has not been read by the RFID locationing system for a predetermined amount of time and has subsequently been read again.

* * * * *